US012367441B2

(12) United States Patent
Jones et al.

(10) Patent No.: US 12,367,441 B2
(45) Date of Patent: Jul. 22, 2025

(54) METHOD AND APPARATUS FOR DETERMINING EFFECTIVENESS OF CYBERSECURITY RISK CONTROLS

(71) Applicant: RiskLens, LLC, Palo Alto, CA (US)

(72) Inventors: Jack Jones, Bloomington, IN (US); Justin Theriot, Mandeville, LA (US)

(73) Assignee: RiskLens, LLC, Palo Alto, CA (US)

( * ) Notice: Subject to any disclaimer, the term of this patent is extended or adjusted under 35 U.S.C. 154(b) by 0 days.

(21) Appl. No.: 17/975,048

(22) Filed: Oct. 27, 2022

(65) Prior Publication Data

US 2023/0153729 A1 May 18, 2023

Related U.S. Application Data

(60) Provisional application No. 63/272,953, filed on Oct. 28, 2021.

(51) Int. Cl.
*G06Q 10/0635* (2023.01)

(52) U.S. Cl.
CPC .............. *G06Q 10/0635* (2013.01)

(58) Field of Classification Search
CPC ................................ G06Q 10/0635
USPC ....................................... 705/7.28
See application file for complete search history.

(56) References Cited

U.S. PATENT DOCUMENTS

| 7,733,224 | B2 | 6/2010 | Tran | |
|---|---|---|---|---|
| 10,349,902 | B2* | 7/2019 | Girouard | G16H 40/67 |
| 10,977,587 | B2* | 4/2021 | Khalili | G06Q 10/06 |
| 11,695,795 | B2* | 7/2023 | Hadar | H04L 63/1433 |
| | | | | 726/25 |
| 2008/0002569 | A1* | 1/2008 | Cole | H04Q 3/0079 |
| | | | | 370/216 |
| 2016/0112445 | A1* | 4/2016 | Abramowitz | G06Q 40/08 |
| | | | | 726/23 |
| 2017/0324765 | A1* | 11/2017 | McLaughlin | H04L 63/1441 |
| 2019/0364073 | A1* | 11/2019 | Jones | H04L 63/1441 |
| 2021/0334386 | A1* | 10/2021 | AlGhamdi | H04L 63/1433 |
| 2022/0335349 | A1* | 10/2022 | Vescio | H04L 63/1425 |

FOREIGN PATENT DOCUMENTS

| WO | WO-2019051166 A1 * | 3/2019 | ........... G06F 21/577 |
|---|---|---|---|
| WO | WO-2022091720 A1 * | 5/2022 | ......... H04L 63/1416 |
| WO | WO-2022264650 A1 * | 12/2022 | |

OTHER PUBLICATIONS

Louise Axon, "Practitioners' Views on Cybersecurity Control Adoption and Effectiveness" In the 16th International Conference on Availability, Reliability and Security (ARES 2021), Aug. 17-20, 2021, Vienna, Austria. ACM, New York, NY, USA, 10 pages. https://doi.org/10.1145/3465481.3470038 (Year: 2021).*
International Search Report and Written Opinion for International Patent Application No. PCT/US2022/48034 dated Feb. 7, 2023 (5 pages).

* cited by examiner

*Primary Examiner* — Abdallah A El-Hage Hassan
(74) *Attorney, Agent, or Firm* — Goodwin Procter LLP

(57) ABSTRACT

A system and method for quantitative measurement of detection and response control effect on risk. Various parameters are used to determine the value of incident detection and response controls, including Maximum Loss ML, Event Velocity $\bar{v}$, Loss Growth Rate G, Visibility V, Recognition R, Monitoring Frequency M, Monitoring Window d, Containment C, Detection and Containment Time T, Recovery Time S, and Realized Loss L.

10 Claims, 2 Drawing Sheets

METHOD AND APPARATUS FOR DETERMINING EFFECTIVENESS OF CYBERSECURITY RISK CONTROLS

RELATED APPLICATION DATA

This application claims benefit of U.S. Provisional Application Ser. No. 63/272,953 filed on Oct. 28, 2021, the disclosure of which is incorporated herein by reference.

BACKGROUND

It is well known that certain types of computer security, i.e. "cybersecurity", risk controls help to reduce the magnitude of loss that organizations experience from cybersecurity events. Examples of such security risk controls include backup and recovery records and tools, logging tools, log monitors and other tools that can mitigate cybersecurity risk by detecting, eliminating and/or reducing the effect of cybersecurity attacks and breaches. Conventionally, cybersecurity and risk management professionals have relied on lists of discrete detection and response controls, which usually are evaluated using ordinal measurements (e.g., high/medium/low, 1-thru-5 scales, etc.). This approach does not consider the systemic dependencies between controls, the subjective nature of ordinal measurements, as well as the fact that performing most mathematical operations on ordinal values generates inaccurate results. Consequently, efficacy measurements, and thus return on investment (ROI) analysis, using conventional cybersecurity tools have been unreliable, which often leads to poor risk management decision-making within an enterprise.

SUMMARY OF THE INVENTION

Disclosed implementations include a method for quantitative measurement of detection and response control effect on risk, thereby allowing security and business professionals to evaluate and implement the most efficient controls. Examples of disclosed implementations are within the context of cybersecurity events. However, the principles underlying the disclosed implementations are applicable to other forms of harm/risk (e.g., natural disasters, technology failures, and the like.)

A first aspect of the invention is a method for determining risk reduction resulting from a risk control implementation, the method comprising, for the risk control implementation: calculating Detection and Containment Time based on parameter values for Event Velocity, Visibility, Recognition, Containment, Monitoring Frequency, and Monitoring Window; determining Realized Loss based on the Detection & Containment Time, the Event Velocity, Loss Growth Rate, the Containment, Recover Time, and Maximum Loss; and comparing the Realized Loss to a baseline value.

BRIEF DESCRIPTION OF THE DRAWINGS

The foregoing summary, as well as the following detailed description of the invention, will be better understood when read in conjunction with the appended drawings. For the purpose of illustrating the invention, there are shown in the appended drawings various illustrative implementations. It should be understood, however, that the invention is not limited to the precise arrangements and instrumentalities shown. In the drawings.

DETAILED DESCRIPTION

Figure 1:
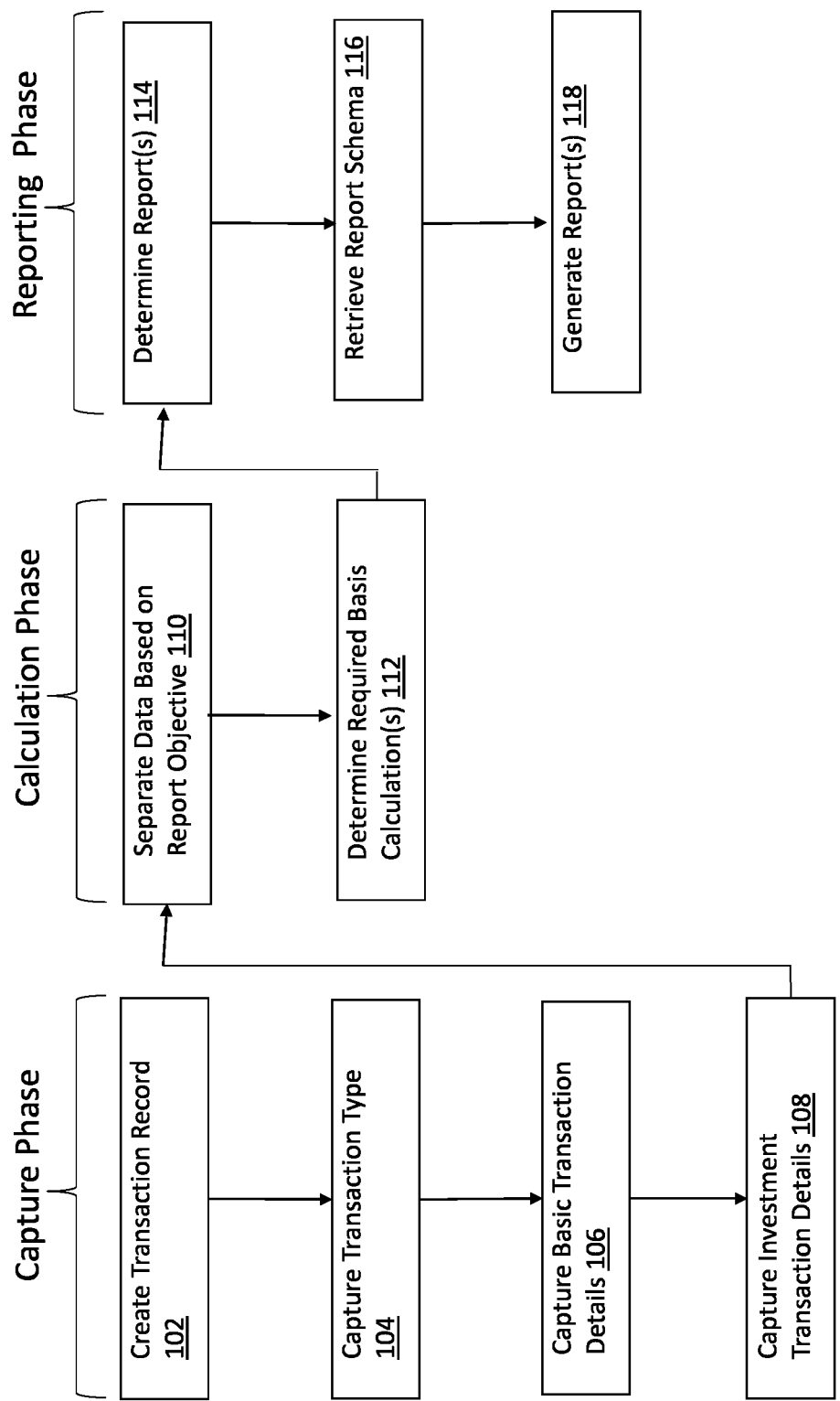
FIG. 1 is a block diagram of a computing architecture that can be used in accordance with disclosed implementations.

The disclosed implementations provide quantitative measurement of detection and response control effect on risk. Risk control implementations can then be compared for efficacy and/or ROI analysis. Various parameters are used to determine the value of incident detection and response controls, including:

Maximum Loss, ML;
Event Velocity, $\bar{v}$;
Loss Growth Rate, G;
Visibility, V;
Recognition, R;
Monitoring Frequency, M;
Monitoring Window, d;
Containment, C;
Detection and Containment Time, T;
Recovery Time, S; and
Realized Loss, L.

Note that all parameter measurements may be expressed as discrete values, ranges, or distributions depending upon available data, as well as how sophisticated the analysis needs to be to meet decision-making requirements. These parameters are discussed in greater detail below. As an example, monitoring or backup frequency controls can be changed and realized loss can be calculated with and without the change. The difference in realized loss due to the change can then be determined.

The potential for harm from adverse events is dependent on the value of assets at risk and/or how much liability may be incurred. For example, business processes such as online retail sales generate revenue when they are operating normally, and customer credit card information potentially exposes an organization to legal and reputation damage if that information is compromised. If the asset(s) at risk are revenue-generating business technologies and processes, then the distribution of potential financial loss is determined by the amount of time the asset(s) are unavailable. The longer an outage persists, the greater the losses. If the asset(s) at risk are information, then the distribution of potential financial loss is determined by the volume and value/liability characteristics of the information at risk. The more information that becomes compromised, the greater the losses.

The Maximum Loss, ML parameter is a threshold for the maximum loss an organization might realize from an event, which in some implementations is based on outage duration or compromised record volume. This threshold can be defined as absolute in nature (e.g., all of the organization's records are compromised, or the organization never recovers from an outage), or it may be defined to represent an "appetite" for loss that the organization sets to measure and manage itself against. For example, an organization might set the basis for Maximum Loss as the losses from an outage of 72 hours. Similarly, an organization might set the basis for Maximum Loss as the losses from a data compromise of 10,000,000 customer records. These thresholds would be established based on the expected financial effects of such events.

Most cyber-attacks transpire over a period of time. For example, after a threat agent gains access to a computing environment (e.g., successfully gains control of a laptop by duping the laptop's user into clicking on a phishing email), some amount of time expires between the moment of initial compromise and when maximum damage is done. How quickly an event progresses from initial compromise to Maximum Loss is referred to as Event Velocity, $\bar{v}$.

The Event Velocity is dependent upon factors such as the type of methods being used by the attacker, their objectives, as well as the complexity of the systems and technologies they are attacking. Event Velocity may be as short as seconds or as long as months, or even years in extreme cases. The typical unit of measurement is, however, days. Empirical data for this variable may be derived from public breach records, an organization's own event history, insurance records, and the like. In the absence of empirical data, subject matter expert estimates may also be used.

Whereas Event Velocity is defined as the days until maximum loss occurs, Loss Growth Rate is defined as the growth rate of losses between the start of an event and when Maximum Loss will occur. It assumes that the potential for higher loss increases the longer an event persists undetected and/or uncontained.

The rate of harm from adverse events may progress linearly, exponentially, or via some other distribution as determined by data from past events or from logical inferences. The formula for an exponential Loss Growth Rate is shown below.

$$G = \frac{\ln(100)}{\bar{v}}$$

where ln is the natural logarithm. The natural logarithm of a number is its logarithm to the base of the mathematical constant e, which is an irrational and transcendental number approximately equal to 2.718281828459.

Visibility controls provide evidence of what is currently or has previously transpired within the risk landscape of interest. For example, web application logs record transactions that take place between users and the application; network logs record transmissions that occur between devices connected to the network, etc. Visibility V efficacy is expressed as the probability that evidence of an adverse event has been captured. This value can be derived by comparing the types of data being collected versus the types of data associated with the adverse events of concern.

Recognition controls are the mechanism of distinguishing between normal and abnormal events that have been captured by Visibility controls. For example, malware signatures and software activity heuristics enable the detection of malicious software; known signatures of network attacks, etc. Recognition R efficacy is measured as the probability that an adverse event will be differentiated from normal or legitimate activity. This value can be derived through both historical event data and/or through testing processes such as attack and penetration exercises.

Monitoring controls are manual or automated processes that review the information provided by Visibility V and uses Recognition R capabilities to determine whether an adverse event has occurred or is in the process of occurring. For example, manual log reviews performed by humans; the application of Bayesian networks to categorize emails as spam, etc. Monitoring Frequency M efficacy is measured as the time between review cycles. Typically, the unit of measurement is days (e.g., monitoring takes place every day, every seven days, etc.). This value can be derived from an organization's policies, processes, and/or technology settings.

Event termination controls provide the mechanism of containing an event by terminating the threat actor's ability to continue to do harm. This may involve separating the threat agent from the assets at risk (e.g., cutting off communication pathways), terminating the threat agent's ability to act in a harmful manner (e.g., removing threat agent resources), etc. Note that terminating an event is predicated upon detecting an event by virtue of the visibility, recognition, and monitoring controls. Containment C control efficacy is measured as the amount of time it takes to terminate the ability of a threat actor to continue to create harm, and is usually measured in days (which may be fractional). This value can be derived from, for example, empirical data from past events, attack and penetration exercises, etc.

Detection and Containment Time T is a value derived by adding the time it takes to detect and contain an event. It should also take into account whether detection occurred at all (e.g., whether the Visibility, Recognition, and Monitoring controls identified that an event has taken place), as well as whether the combined detection and Containment time exceeds the event's Event Velocity (when Maximum Loss is expected to be realized).

T can be determined in accordance with the equation below.

$$T = \begin{cases} M - (d \sim U([0, M])) + (c \sim U([C_{min}, C_{max}])) & X \sim (U([0, 1])) < (v \sim U([V_{min}, V_{max}])) * (r \sim U([R_{min}, R_{max}])) \\ \bar{v} & X \sim (U([0, 1])) \geq (v \sim U([V_{min}, V_{max}])) * (r \sim U([R_{min}, R_{max}])) \end{cases}$$

Note that the variable "d" in the formula above sets a day within the monitoring window in which the event begins. For example, if Monitoring takes place every five days, an event may begin on any one of the days within that five-day window. This variable start time should be accounted for when determining whether Event Velocity has been exceeded.

Recovery controls provide the means of returning to normal operational capabilities when an adverse event occurs. For example, redundant systems, hot or cold recovery sites, etc. Note that recovery controls are only relevant for events that affect the operational capacity of an organization—i.e., outages. It is not relevant to data compromise events. Recovery Time S is measured as the time required to restore normal operating capacity. This value can be derived from empirical data from past outage events, as well as from business continuity or other testing processes.

Realized Loss L is the amount of loss an organization experiences from an adverse event. This description of the invention specifically provides two examples of measuring Realized Loss (e.g., for data compromise and outage events), although similar formulae may be used for other types of events. Note that two different formulae are required due to the different natures of data compromise and outage events. Specifically, detection controls are assumed to not be relevant in outage events because the outage itself provides evidence that an event has occurred. Likewise, as described earlier, Recovery controls aren't relevant in data compromise events. The equation below can be used to determine data compromise realized loss.

$$L = \frac{e^{GT}}{100} * ML$$

The equation below can be used to determine outage events realized loss.

$$L = \begin{cases} ML & (c \sim U([C_{min}, C_{max}])) + (s \sim U([S_{min}, S_{max}])) \geq \bar{v} \\ \frac{e^{G(C+S)}}{100} * ML & (c \sim U([C_{min}, C_{max}])) + (s \sim U([S_{min}, S_{max}])) < \bar{v} \end{cases}$$

Of the variables used in the method, Maximum Loss and Monitoring are usually discrete values rather than ranges or distributions (e.g., Maximum Loss based on, explicitly, the existence of 10,000,000 customer records at risk, Monitoring takes place exactly every five days). The other variables, however, will almost always have some amount of uncertainty about them, which must be accounted for through the use of ranges or distributions. This uncertainty dictates that stochastic methods (e.g., Monte Carlo simulations) are applied to these values in order to produce distributions of possible outcomes.

The following two algorithms concisely describe how Realized Loss is derived. Algorithm 1 can be applied to determine Detection and Containment Time T. Algorithm 2 can be applied to determine Realized Loss, L based on the determined value of T.

---

Algorithm 1: Calculate Detection & Containment Time, DCT

| input: | Event Velocity, $\bar{v}$ |
| --- | --- |
| | Visibility, $V \sim U([V_{min}, V_{max}])$ |
| | Recognition, $R \sim U([R_{min}, R_{max}])$ |
| | Containment, $C \sim U([C_{min}, C_{max}])$ |
| | Monitoring Frequency, M |
| | Monitoring Window, d |
| output: | T, Float for the Detection & Containment Time |
| | $T = \bar{v}$ |
| | $X \leftarrow X \sim U([0,1])$ |
| | $d \leftarrow d \sim U([0, M])$ |
| | if $X < V * R$ then |
| | $T = (M - d) + C$ |
| | end if |

---

Algorithm 2: Measure Incident Detection & Response Values, MIDR

| input: | Detection & Containment Time, $T \leftarrow DCT(\bar{v}, V, R, C, M, d)$ |
| --- | --- |
| | Event Velocity, $\bar{v}$ |
| | Loss Growth Rate, $G = \frac{\ln(100)}{\bar{v}}$ |
| | Containment, $C \sim U([C_{min}, C_{max}])$ |
| | Recovery Time, $S \sim U([S_{min}, S_{max}])$ |
| | Max Loss, ML |
| output: | Float, Realized Loss, $\mathcal{L}$ |

$\mathcal{L} = ML$
if Data Breach then $$\mathcal{L} = \frac{e^{GT}}{100} * ML$$

end if
else if Outage and $\bar{v} > C * S$ then $$\mathcal{L} = \frac{e^{G(C+S)}}{100} * ML$$

---

Algorithm 2: Measure Incident Detection & Response Values, MIDR end if

---

Determining the risk reduction value of detection and response controls can be achieved by establishing a baseline of expected Realized Loss based on an organization's current values for each input variable. Then each control's value (e.g., Monitoring time window) can be adjusted or eliminated and a new Realized Loss value is determined using the method of this invention. The difference between the baseline value and the new value describes that control's risk reduction value.

Note, however, that several other important use-cases exist for this invention:
  When the cost of a control is also considered, an organization can determine the cost-efficacy of its control investments. This enables the identification of which detection and response controls are most or least cost-effective.
  By comparing baseline measurement of Realized Loss against proposed control improvements, an organization may use this method to determine the cost-benefit of specific improvements to its control portfolio.
  This method can also be applied as the basis for sensitivity analyses whereby an organization can manually, or through method-enabled software, iterate through any combination of controls and control efficacies to identify which combination of controls provides the best cost-benefit for managing the adverse events it is subject to.

FIG. 1 illustrates computing architecture 100 in accordance with disclosed implementations. Architecture 100 includes measuring platform 102 (the computing system for accomplishing the methods disclosed herein) and Computing system 150 (the computing system for which loss measurement is performed. Computing system 150 can be one or more enterprise computing systems which include various components, $152_1, 152_2 \ldots 152_n$).

Measuring platform 102 includes computer hardware processor 110 and memory device 112. Memory device 112 includes code that is executable by processor 110 to accomplish the various functions disclose herein. The code is described herein as corresponding to "modules" for performing specified functions that are described below with respect to the method illustrated in FIG. 2. The modules include Probability Detection Module 120, Time Between Monitoring Module 122, Time to Terminate Module 124, Monitoring and event Summing Module 126, Time required to Return Module 128, Time Summing Module 130, Event Velocity Determination Module 132, Value/Liability Distribution Module 134, Value Determination Module 136, Comparison Module 134, Loss Determination Module 136, Subtracting Module 138, Aggregate Risk Reduction Module 140, and Value Evaluation Module 142. When executed, the various modules accomplish the method described in connection with FIG. 2.

Figure 2:
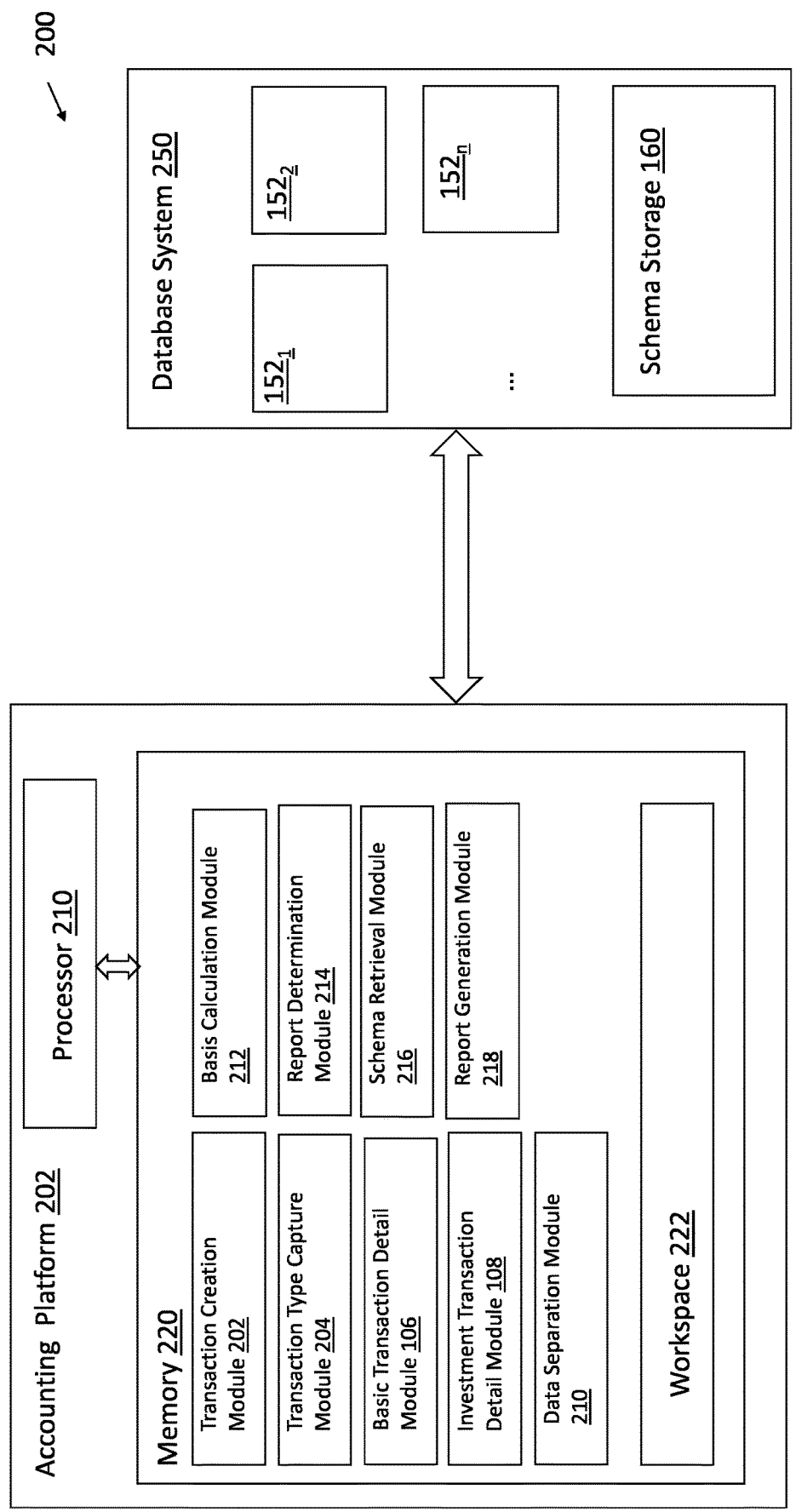
FIG. 2 is a flowchart of a method to quantitative measurement of detection and response control effect on risk in accordance with disclosed implementations.

FIG. 2 illustrates a method of measuring risk reduction in accordance with the disclosed implementations. At step 220, the probability of detection occurring is determined based on the Visibility and Recognition parameters. Because visibility and recognition have a Boolean AND relationship (i.e., both have to be true in order for detection to be possible) this step can include multiplying their probabilities to determine the probability that detection will occur when a monitoring action takes place. If the visibility and recognition parameters are uncertain and therefore expressed as ranges or distributions, then stochastic methods such as Monte Carlo can be used. This step can be accomplished by Probability detection module 120.

At step 222 the time between monitoring actions is determined in the manner described above. Alternatively, stochastic methods such as Monte Carlo may be used to determine how much time remains until the next monitoring action. This step can be accomplished by time between monitoring module 122. At step 224, the time to terminate an adverse event is determined in the manner described above. Alternatively, stochastic methods such as Monte Carlo may be used to determine how long it would take to terminate an adverse event. This step can be accomplished by time to terminate module 124. At step 226, the monitoring and event termination times are summed. This step can be accomplished by monitoring and event summing module 126.

At step 228, If the type of event is such that the organization's operational capacity could be affected, the time required to return to normal operations is determined given the resilience controls that are in place. This can be accomplished by time required to return module 128. At step 230, If the type of event is such that the organization's operational capacity could be affected, the time from step 226 is summed with the time from step 228. Otherwise, the time for this step equals the time from step 226. This step can be accomplished by time summing module 130.

At step 232, the event velocity is determined in the manner described above. This step can be accomplished by event velocity determination module 132. At step 234, the value/liability distribution is determined for the assets at risk. This step can be accomplished by value/liability distribution module 134. At step, 236, the highest value from the distribution in step 234 is determined. This step can be accomplished by highest value determination module 136. At step 238, if detection is possible given the visibility and recognition values in step 220, the time resulting from step 230 is compared to the event velocity time from step 232. If the time from step 230 is greater than the time from step 232, then maximum potential loss is assumed. If the time from step 230 is less than the time from step 232, the potential loss is some fraction of the maximum potential loss. What fraction this would be is determined by where the time from step 6 falls relative to the time from step 232 within the event velocity acceleration curve. Stochastic methods such as Monte Carlo may be used to perform this function. This step can be accomplished by comparison module 138.

At step 240, If loss minimization controls are in place, the amount of loss the controls are capable of providing is determined, by applying algorithms 1 and 2 above to the determined variables, for example. At step 242, the value resulting from step 240 (if any) is subtracted from the value resulting from step 238. This step can be accomplished by subtracting module 142. At step 244, the value resulting from step 242 is used to represent the aggregate risk reduction value of the detection and response controls that are in place. This step can be accomplished by aggregate risk reduction module 144.

At step 246, the value of proposed changes to detection and/or response controls can be evaluated individually or in combination by accounting for their effects in the appropriate steps above. When combined with the costs incurred or saved by adding or removing controls, this provides the ability to determine the ROI of proposed changes because the cost for any changes can be compared to the value realized from the changes. This step can be accomplished by value evaluation module 146.

The disclosed implementations require complex calculations that cannot pragmatically be accomplished without an electronic digital computing platform. Computing systems and/or logic referred to herein can comprise an integrated circuit, a microprocessor, a personal computer, a server, a distributed computing system, a communication device, a network device, or the like, and various combinations of the same. A computing system or logic may also comprise volatile and/or non-volatile memory such as random access memory (RAM), dynamic random access memory (DRAM), static random access memory (SRAM), magnetic media, optical media, nano-media, a hard drive, a compact disk, a digital versatile disc (DVD), optical circuits, and/or other devices configured for storing analog or digital information, such as in a database. A computer-readable medium, as used herein, expressly excludes paper. Computer-implemented steps of the methods noted herein can comprise a set of instructions stored on a computer-readable medium that when executed cause the computing system to perform the steps. A computing system programmed to perform particular functions pursuant to instructions from program software is a special purpose computing system for performing those particular functions. Data that is manipulated by a special purpose computing system while performing those particular functions is at least electronically saved in buffers of the computing system, physically changing the special purpose computing system from one state to the next with each change to the stored data.

The logic discussed herein, referred to as "modules", may include hardware, firmware and/or software stored on a non-transient computer readable medium. This logic may be implemented in an electronic device to produce a special purpose computing system. The systems discussed herein optionally include a microprocessor configured to execute any combination of the logic discussed herein. The methods discussed herein optionally include execution of the logic by said microprocessor. The disclosed implementations are described as including various "modules", "engines", and "logic", all of which refer to executable code and a computer hardware processor for executing the code to accomplish the described functionality. The Data Storage may be distributed throughout several computing devices.

It will be appreciated by those skilled in the art that changes could be made to the implementations described above without departing from the broad inventive concept thereof. It is understood, therefore, that this invention is not limited to the particular implementations disclosed, but it is intended to cover modifications within the spirit and scope of the present invention as defined by the appended claims.

What is claimed:

1. A method of mitigating cybersecurity risk reduction resulting from a risk control implementation, the method comprising:
   identifying a proposed change to risk controls for mitigating cybersecurity risk associated with an organization, the proposed change including an event termination control for containing an adverse cybersecurity event by terminating a threat agent's ability to continue to do harm to a computer system associated with the organization;
   calculating Detection and Containment Time associated with the proposed change based on parameter values for Event Velocity, Visibility, Recognition, Containment, Monitoring Frequency, and Monitoring Window;

determining Realized Loss associated with the proposed change based on the Detection & Containment Time, the Event Velocity, Loss Growth Rate, the Containment, Recover Time, and Maximum Loss;

comparing the Realized Loss to a baseline value; and responsive to an outcome of the comparison, executing the event termination control to (i) cut off a communication pathway to separate the threat agent from an asset at risk and (ii) remove threat agent resources to terminate the threat agent's ability to act in a harmful manner, wherein calculating the Detection and Containment Time is accomplished based on the following algorithm:

| input: | Event Velocity, $\bar{v}$ |
|---|---|
| | Visibility, $V \sim U([V_{min}, V_{max}])$ |
| | Recognition, $R \sim U([R_{min}, R_{max}])$ |
| | Containment, $C \sim U([C_{min}, C_{max}])$ |
| | Monitoring Frequency, M |
| | Monitoring Window, d |
| output: | T, Float for the Detection & Containment Time |
| | $T = \bar{v}$ |
| | $X \leftarrow X \sim U([0,1])$ |
| | $d \leftarrow d \sim U([(0, M])$ |
| | if $X < V * R$ then |
| | $T = (M - d) + C$ |
| | end if. |

2. The method claim 1, wherein determining the realized loss is accomplished based on the following algorithm:

| input: | Detection & Containment Time, $T \leftarrow DCT(\bar{v}, V, R, C, M, d)$ |
|---|---|
| | Event Velocity, $\bar{v}$ |
| | Loss Growth Rate, $G = \dfrac{\ln(100)}{\bar{v}}$ |
| | Containment, $C \sim U([C_{min}, C_{max}])$ |
| | Recovery Time, $S \sim U([S_{min}, S_{max}])$ |
| | Max Loss, ML |
| output: | Float, Realized Loss, $\mathcal{L}$ |

$\mathcal{L} = ML$
if Data Breach then $$\mathcal{L} = \frac{e^{GT}}{100} * ML$$

end if
else if Outage and $\bar{v} > C * S$ then $$\mathcal{L} = \frac{e^{G(C+S)}}{100} * ML$$

end if.

3. The method of claim 2, wherein parameters for the Visibility and the Recognition both have to be true in order for detection of risk to be possible when a monitoring action takes place.

4. A computing system for mitigating cybersecurity risk determining, the system comprising:

at least one computer processor;

at least one memory device having executable instructions stored thereon which, when executed by the at least one computer processor, cause the at least one computer processor to carry out a method comprising:

identifying a proposed change to risk controls for mitigating cybersecurity risk associated with an organization, the proposed change including an event termination control for containing an adverse cybersecurity event by terminating a threat agent's ability to continue to do harm to a computer system associated with the organization;

calculating Detection and Containment Time associated with the proposed change based on parameter values for Event Velocity, Visibility, Recognition, Containment, Monitoring Frequency, and Monitoring Window;

determining Realized Loss associated with the proposed change based on the Detection & Containment Time, the Event Velocity, Loss Growth Rate, the Containment, Recover Time, and Maximum Loss;

comparing the Realized Loss to a baseline value; and responsive to an outcome of the comparison, executing the event termination control to (i) cut off a communication pathway to separate the threat agent from an asset at risk and (ii) remove threat agent resources to terminate the threat agent's ability to act in a harmful manner, wherein calculating the Detection and Containment Time is accomplished based on the following algorithm:

| input: | Event Velocity, $\bar{v}$ |
|---|---|
| | Visibility, $V \sim U([V_{min}, V_{max}])$ |
| | Recognition, $R \sim U([R_{min}, R_{max}])$ |
| | Containment, $C \sim U([C_{min}, C_{max}])$ |
| | Monitoring Frequency, M |
| | Monitoring Window, d |
| output: | T, Float for the Detection & Containment Time |
| | $T = \bar{v}$ |
| | $X \leftarrow X \sim U([0,1])$ |
| | $d \leftarrow d \sim U([0, M])$ |
| | if $X < V * R$ then |
| | $T = (M - d) + C$ |
| | end if. |

5. The system of claim 4, wherein determining the realized loss is accomplished based on the following algorithm:

| input: | Detection & Containment Time, $T \leftarrow DCT(\bar{v}, V, R, C, M, d)$ |
|---|---|
| | Event Velocity, $\bar{v}$ |
| | Loss Growth Rate, $G = \dfrac{\ln(100)}{\bar{v}}$ |
| | Containment, $C \sim U([C_{min}, C_{max}])$ |
| | Recovery Time, $S \sim U([S_{min}, S_{max}])$ |
| | Max Loss, ML |
| output: | Float, Realized Loss, $\mathcal{L}$ |

$\mathcal{L} = ML$
if Data Breach then $$\mathcal{L} = \frac{e^{GT}}{100} * ML$$

end if
else if Outage and $\bar{v} > C * S$ then $$\mathcal{L} = \frac{e^{G(C+S)}}{100} * ML$$

end if.

6. The system of claim 5, wherein parameters for the Visibility and the Recognition both have to be true in order for detection of risk to be possible when a monitoring action takes place.

7. The method of claim 1, wherein the proposed change further comprises a recovery control for providing a mechanism of returning the computer system to normal operational capabilities when the adverse cybersecurity event occurs.

8. The method of claim 7, further comprising, responsive to the outcome of the comparison, implementing the recovery control by establishing one or more of a redundant system, a hot recovery site, or a cold recovery site.

9. The system of claim 4, wherein the proposed change further comprises a recovery control for providing a mechanism of returning the computer system to normal operational capabilities when the adverse cybersecurity event occurs.

10. The system of claim 9, further comprising, responsive to the outcome of the comparison, implementing the recovery control by establishing one or more of a redundant system, a hot recovery site, or a cold recovery site.

\* \* \* \* \*

UNITED STATES PATENT AND TRADEMARK OFFICE
CERTIFICATE OF CORRECTION

| | | |
|---|---|---|
| PATENT NO. | : 12,367,441 B2 | Page 1 of 1 |
| APPLICATION NO. | : 17/975048 | |
| DATED | : July 22, 2025 | |
| INVENTOR(S) | : Jack Jones et al. | |

It is certified that error appears in the above-identified patent and that said Letters Patent is hereby corrected as shown below:

In the Claims

At Column 8, Lines 54-55, Claim 1, remove "reduction resulting from a risk control implementation".

At Column 9, Line 59, Claim 4, remove "determining".

Signed and Sealed this
Ninth Day of December, 2025

John A. Squires
*Director of the United States Patent and Trademark Office*